Nov. 24, 1931.  F. B. THOMAS  1,832,883
BRAKE AND DOOR INTERLOCK
Filed May 23, 1930
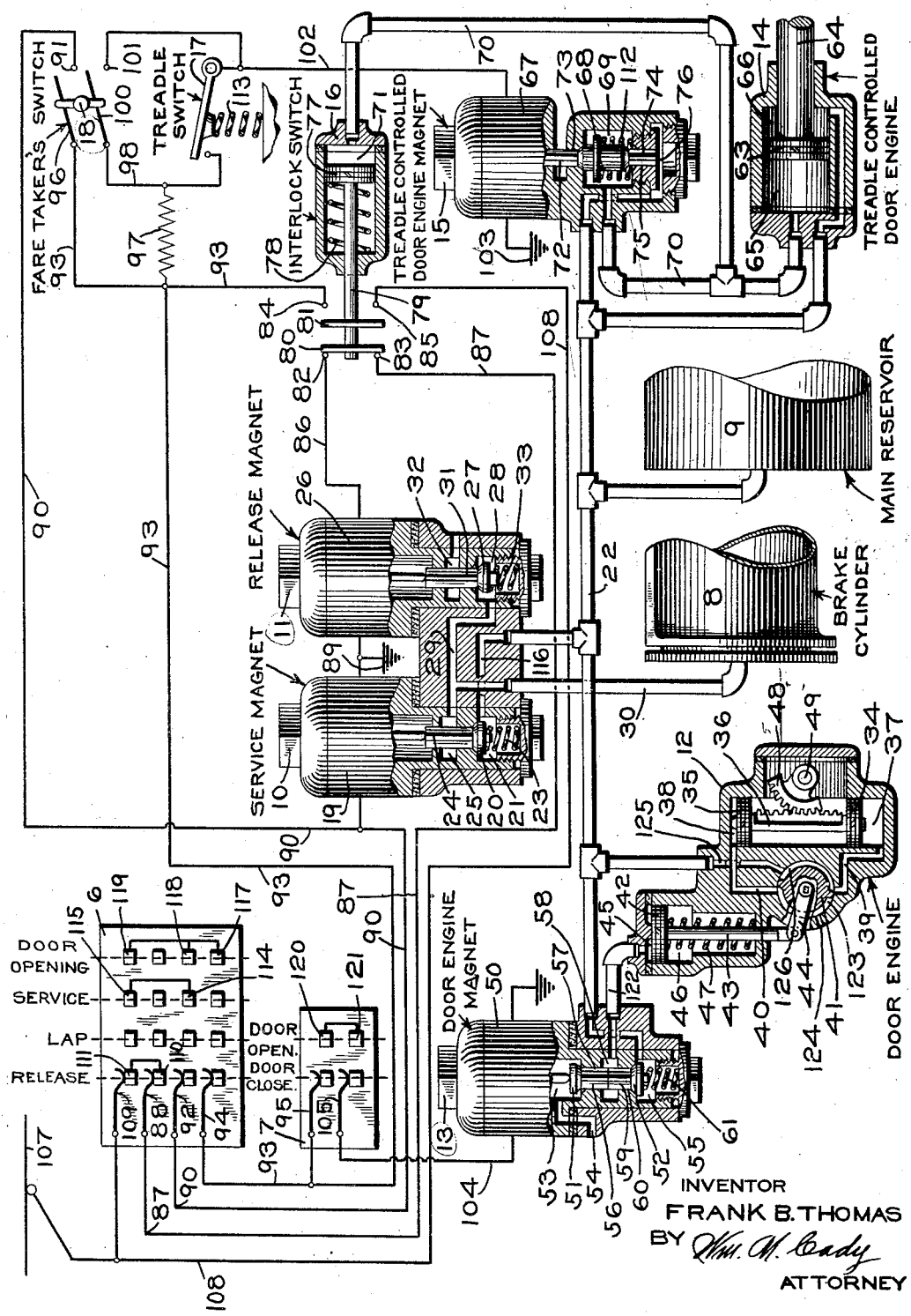
INVENTOR
FRANK B. THOMAS
BY Wm. M. Cady
ATTORNEY Patented Nov. 24, 1931

1,832,883

UNITED STATES PATENT OFFICE

FRANK B. THOMAS, OF WILKINSBURG, PENNSYLVANIA, ASSIGNOR TO THE WESTING-HOUSE AIR BRAKE COMPANY, OF WILMERDING, PENNSYLVANIA, A CORPORATION OF PENNSYLVANIA

BRAKE AND DOOR INTERLOCK

Application filed May 23, 1930. Serial No. 454,967.

This invention relates to safety car equipment, and more particularly to an electropneumatically controlled door and brake controlling equipment.

An object of the invention is to provide an improved car door and brake controlling equipment in which a passenger on the car may prevent the release of the brakes under certain conditions.

Another object of the invention is to provide a door and brake controlling equipment having means under the control of a fare taker for preventing the release of the brakes when a car door is open.

Another object of the invention is to provide an improved car door and brake interlocking equipment of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic view of a safety car control equipment embodying the invention.

Referring to the drawing, the equipment may comprise a brake switch device 6, a selector switch device 7, a brake cylinder 8, main reservoir 9, a service magnet valve device 10, a release magnet valve device 11, a door engine 12, a magnet valve device 13 for controlling the door engine 12, a treadle controlled door engine 14, a magnet valve device 15 for controlling the door engine 14, an interlock switch device 16, a treadle switch 17, and a fare taker's switch 18.

The service magnet valve device 10 and the release magnet valve device 11 are provided for controlling the brakes electrically.

The service magnet valve device 10 may comprise a magnet 19 and a valve 20, adapted to be operated by said magnet. The valve 20 is mounted in a chamber 21 connected to the main reservoir pipe 22. The valve 20 has a fluted stem 24 extending through a chamber 25, which is separated from the chamber 21 by a suitable wall in the casing. A spring 23 contained in chamber 21, maintains the valve 20 seated when the magnet 19 is deenergized.

The release magnet valve device 11 may comprise a magnet 26 and a valve 27 adapted to be operated by said magnet. The valve 27 is mounted in a chamber 28 connected to the chamber 25 of the service magnet valve device 10 by a passage 29, the passage 29 in turn being connected with the brake cylinder 8 through a passage and pipe 30. The valve 27 has a fluted stem 31 extending through a chamber 32, which is separated from the chamber 28 by a suitable wall in the casing. The chamber 32 is open to the atmosphere. A spring 33 contained in chamber 28 maintains the valve 27 seated when the magnet 26 is deenergized.

The door operating engine 12 may comprise two pistons 34 and 35, which are connected by a stem 36, provided on one side with a rack of gear teeth.

The piston 34 has at one side, a chamber 37, while the piston 35 has at the opposite side, a chamber 38. The chambers 37 and 38 are respectively connected by passages 39 and 40, to a valve 41 adapted to control the fluid pressure in said chambers.

The valve 41 is operated by a piston 42 having a stem 43 connected to an operating arm 44, which is secured to the valve.

At one side of the piston 42 there is a chamber 45, while at the opposite side of said piston there is a chamber 46.

A spring 47, contained in chamber 46, is adapted to normally maintain the piston 42 in the upper position shown in the drawing, in which the valve 41 is in the door closed position.

Engaging the gear toothed rack on stem 36 is a gear segment 48 which is fulcrumed on a pin 49. The segment 48 is adapted to operate the car door (not shown), in the well known manner.

The magnet valve device 13 may comprise a magnet 50 and double beat valves 51 and 52 adapted to be operated by said magnet. The valve 51 is contained in a chamber 53, open to the atmosphere through an exhaust port 54, while the valve 52 is contained in a chamber 55, which is connected to the main reservoir pipe 22. The valve 51 has a fluted stem 56 extending through a suitable bore 57 in the casing and engaging in a chamber 58, a fluted stem 59 of the valve 52. The stem 59 extends through a suitable bore 60, which connects chambers 55 and 58. A spring 61, contained in chamber 55, acts on the valve 52, tending to seat said valve and unseat the valve 51. Chamber 58 is connected to the chamber 45 by a pipe 122.

The door engine 14 may comprise a piston 63, the stem 64 of which is connected to the operating leverage system (not shown).

The piston 63 has at one side, a chamber 65 and at the opposite side, a chamber 66. The piston stem 64 is made relatively large, so that a differential in pressures is present in the chambers on the opposite sides of the piston 63 for a purpose to be hereinafter more fully described.

The magnet valve device 15 may comprise a magnet 67 and a double beat valve 68, adapted to be operated by said magnet. The double beat valve 68 is mounted in a chamber 69 connected to the piston chamber 65 of the door engine 64 by a pipe 70, said pipe being also connected to a piston chamber 71 of the switch device 16. On one side the valve 68 has a fluted stem 72 extending through a suitable bore 73 in the casing, which connects the chamber 69 to the atmosphere in one position of the valve. On the opposite side the valve 68 has a fluted stem 74 extending through a suitable bore 75 which connects the chamber 69 with a chamber 76 connected to the main reservoir pipe 22.

The switch device 16 may comprise a casing having a cylinder containing a piston 77 subject on one side to the pressure of fluid in chamber 71 heretofore referred to and subject on the opposite side to the pressure of a spring 78. The piston 77 has a stem 79, which is provided with a pair of spaced contact members 80 and 81. The contact member 80 is adapted, in one position of the piston 77, to engage contacts 82 and 83, while the contact member 81 is adapted, in another position of the piston 77, to engage contacts 84 and 85.

The contact 82 is connected by a wire 86 to one terminal of the release magnet 26, and the contact 83 is connected by a wire 87 to a spring finger 88 of the brake switch 6. The other terminal of the magnet 26 and one terminal of the service magnet 19 are both connected to a common ground 89. The other terminal of the magnet 19 is connected by a wire 90 to a contact 91 of the fare taker's switch 18 and also to a spring finger 92 of the brake switch 6.

The contact 84 is connected by a wire 93 respectively to a spring finger 94 of the brake switch 6, a spring finger 95 of the selector switch 7, and a contact member 96 of the fare taker's switch 18.

A resistance 97 is connected to the wire 93 and also to a wire 98. The wire 98 in turn, connects a contact 99 of the treadle switch 17 and a contact member 100 of the fare taker's switch 18.

The fare taker's switch 18 has a contact 101, which is connected to the treadle of the treadle switch 17 and also to one terminal of the magnet 67 of the door engine magnet valve device 15 by a wire 102. The other terminal of the magnet 67 is connected to a ground 103.

One terminal of the magnet 50 of the door engine magnet valve device 13 is connected by a wire 104 to a spring finger 105 of the selector switch 7, and the other terminal of said magnet is connected to a ground 106.

Current from a suitable source of supply such as a trolley wire 107, is supplied through a wire 108, which is connected to a spring finger 109 of the brake switch 6 and to the contact 85 of the interlock switch 16.

In operation, when the brake switch 6 is in release position, the fingers 88 and 109 engage electrically connected contacts 110 and 111, so that current is supplied from the current supply wire 108 to the wire 87.

With the foot off the treadle and the treadle switch 17 held open by spring 113, the magnet 67 is deenergized, and the double beat valve 68 is in the upper position as shown, through the action of spring 112 in chamber 69. In this position fluid under pressure is supplied from the main reservoir 9 to piston chambers 65 and 66 of the door engine 14 and to piston chamber 71 of the switch 16, through pipe 70. The piston 77 will thus be so positioned to the left, that the contact member 80 engages the contacts 82 and 83, so that current is supplied by the wire 86 to the release magnet 26.

In this way the release magnet 26 is energized, so that the valve 27 is held unseated. With the valve 27 unseated, the brake cylinder 8 is vented to the atmosphere, through pipe 30, passage 29, chamber 28, past the fluted stem 31 of the valve 27, and chamber 32, which is open to the atmosphere, as has been heretofore described.

When the release magnet 26 is energized, the service magnet 19 is deenergized, so that the valve 20 is held seated by the spring 23, thereby cutting off the communication from the main reservoir pipe 22 through the service magnet valve device 10.

The selector switch 7 being in door closed position, the magnet 50 is deenergized, so that the valve 52 is held seated by the spring 61 and the valve 51 is held unseated.

With the valve 52 seated communication from the main reservoir pipe 22, through the magnet valve device 13, is cut off, and with the valve 51 held unseated, piston chamber 45 of the door engine 12 is vented to the atmosphere, through chamber 58, bore 57, chamber 53, and port 54.

In the release position of the brake switch, the wires 90 and 93 are not supplied with electric current, so that even if the treadle 17 were depressed by a passenger on the car, current would not be supplied to energize the magnet 67.

If the operator wishes to effect a service application of the brakes without opening the car doors, he moves the brake switch to service position, in which current is not supplied to the wires 87 and 86 and consequently, the release magnet 26 is deenergized.

When the release magnet 26 is thus deenergized, the valve 27 is seated, cutting off the exhaust from the brake cylinder 8.

With the brake switch 6 in service position, the fingers 92 and 109 engage electrically connected contacts 114 and 115, so that current is supplied from the current supply wire 108 to the wire 90, and the service magnet 19 is energized, so that the valve 20 is unseated.

The unseating of the valve 20 opens a communication, so that fluid under pressure is supplied from the main reservoir pipe 22 to the brake cylinder 8, through passage 116, chamber 21, past the open valve 20, to chamber 25 and thence through passage 29 and pipe 30.

The car doors cannot be opened in this position, even if a passenger steps on the treadle 17, since electric current is not supplied in this position to the wire 93.

If the operator wishes to open the car doors controlled by the door engine 12, or permit the opening of the car doors controlled by the door engine 14, he turns the brake switch to the door open position. In this position the fingers 94, 92 and 109 engage, respectively, electrically connected contacts 117, 118 and 119, in which an electric service application of the brakes is effected as in the service doors closed position, and in addition, current is supplied to the circuit wire 93.

The supply of current to the circuit wire 93 will not be effective, however, unless the operator moves the selector switch 7 to door open position, or unless a passenger steps on and depresses the treadle 17, or unless the fare taker closes the switch 18.

When the operator moves the selector switch 7 to door open position, in which the fingers 95 and 105 engage electrically connected contacts 120 and 121, so that current is supplied through the circuit wire 104 to the magnet 50 of the door engine 12.

Electric current supplied to the magnet 50, energizes said magnet, which operates to seat the valve 51 and unseat the valve 52. The unseating of the valve 52 permits fluid at main reservoir pressure to flow from pipe 22 through valve chamber 55, past valve 52, through chamber 58 and passage and pipe 122 to the piston chamber 45 of the valve controlling piston 42. The pressure of fluid in chamber 45 then moves piston 42 downwardly, which rotates the valve 41 in a counter clockwise direction to door opening position. In this position fluid under pressure is vented from the piston chamber 37 to the atmosphere through passage 39, cavity 123 in the valve 41, and atmospheric exhaust passage 124, and fluid under pressure is supplied to the piston chamber 38 from passage 125, through cavity 126 in the valve 41, and passage 40. The pressure of fluid in the piston chamber 38 then shifts the pistons 34 and 35 downwardly, or to door opening position.

The downward movement of the door engine pistons 34 and 35, causes the gear segment 48 to rotate in a counter clockwise direction, which operates to open the doors in the well known manner.

With the selector switch 7 and the brake switch 6 in door open position, if a passenger wishes to open the car doors controlled by the magnet 67, the treadle 17 is depressed so as to close the circuit from the wire 93, through the resistance 97, to the wire 102.

The closing of this circuit permits electric current to flow to the magnet 67 and said magnet will be energized, causing the double beat valve 68 to move downwardly, to close the communication through the bore 75, and open the communication through the bore 73.

The fluid under pressure in piston chamber 65 of the door engine 14 and also the fluid under pressure in the piston chamber 71 of the interlocking switch 16 is then vented to the atmosphere, through pipe 70, chamber 69, and bore 73.

The pressure of fluid in chamber 66 of the door engine 14 then shifts the piston 63 to the left, or to door opening position.

When the piston chamber 71 of the interlocking switch 16 is vented to the atmosphere in the manner just described, the spring 78 acting on the piston 77 shifts said piston to right, so that the contact member 80 is withdrawn from its engagement with the contacts 82 and 83, and the contact member 81 connects the contacts 84 and 85. The shifting of the contact members 80 and 81 has no effect on the supply of current to the magnet 67, so that said magnet will remain energized as long as the treadle 17 is held depressed, and therefore, the car doors controlled by the door engine 14 will remain open. However, the shifting of the contact members 80 and 81 in the above described manner prevent the release of the brakes, since the circuit through the wire 86 of the release magnet circuit will remain open, as long as the car doors controlled by the door engine 14 remain open.

If the car operator should attempt to close the car doors or release the brakes, he cannot do so as long as a passenger holds the treadle 17 depressed, since with the treadle depressed, current is supplied to the magnet 67 and said magnet is energized, and when the magnet 67 is energized, the double beat valve 68 is held in the position in which the piston chamber 71 is vented to the atmosphere, so that the spring 78 acts on the piston to maintain the same in the position in which the contact member 80 is disconnected from the contacts 82 and 83.

The door controlled by the door engine 14 being opened, the circuit from wire 87 to the release magnet 26 is held open, so that the operator will be unable to energize the release magnet 26 by movement of the brake switch to release position, because as long as the treadle 17 is depressed, current will be supplied through the wire 108 to energize the magnet 67.

When there is no passenger holding the treadle 17 depressed, the magnet 67 will be deenergized, and the double beat valve will be seated in the position shown in the drawing. Fluid under pressure is then supplied to the piston chambers 65 and 71 from the main reservoir 9 in the manner heretofore described. The pistons 63 and 71 are therefore shifted to their positions at the left, by which movement, the stem 64 is operated to close the car doors, and the contact members 80 and 81 are returned to their respective positions in which the circuit from the wire 108 to the wire 93 is opened and the circuit from the wire 87 to the wire 86 is closed. The brakes may now be released when the operator moves the brake switch to release position, in which current is supplied to the release magnet 26.

In addition to the treadle switch 17, the operation of the door engine 14 can be controlled by the switch 18, which is adapted to close the circuit of the magnet 67 in the same manner as does the treadle 17.

With the switch 18 closed, contact member 100 of said switch closes the circuit from the wire 93, through the resistance 97 to the wire 102, so that current is supplied to the magnet 67, when the brake switch is in door open position. The operation of the magnet 67, and the parts controlled thereby will therefore be the same as has heretofore been described in connection with the operation of the treadle switch 17, and the car operator will be prevented from releasing the brakes as long as the switch 18 is closed.

The contact member 96 of the switch 18 closes the circuit from the wire 93 to the wire 90, so that the service magnet 19 is maintained energized when the switch 18 is closed, and therefore the car operator will be prevented from releasing the brakes in the same manner as described in connection with the operation of the treadle switch 17.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a car door engine for controlling a car door, of a magnet valve device for controlling the operation of said door engine, a magnet valve device for controlling the release of the brakes, and a switch device controlled by fluid under pressure supplied to the car door engine for controlling the circuit of said release magnet valve device.

2. The combination with a car door engine for controlling a car door, of a magnet valve device for controlling the operation of said door engine, a magnet valve device for controlling the release of the brakes, and pneumatically operated switch device controlled by fluid under pressure supplied to the car door engine for controlling the circuit of said release magnet valve device.

3. The combination with a car door engine for controlling a car door, of a magnet valve device for controlling the operation of said door engine, manually controlled means for controlling the circuit of said door magnet valve device, a magnet valve device for controlling the release of the brakes, and a pneumatically operated switch device controlled by fluid under pressure supplied to the car door engine for controlling the circuit of said release magnet valve device.

4. The combination with electrically operated means for controlling the release of the brakes of a car, and a brake switch for controlling said electrically operated means, of a door engine for controlling the opening and closing of a car door, electrically operated means for controlling said door engine, and means for controlling the circuits of both of said electrically operated means for preventing the operation of said brake releasing means when said door engine means is operated.

5. The combination with electrically operated means for controlling the release of the brakes of a car, and a brake switch for controlling said electrically operated means, of a door engine for controlling the opening and closing of a car door, electrically operated means for controlling said door engine, means for controlling the circuit of both of said electrically operated means for preventing the operation of said brake releasing means when said door engine means is operated, and a manually operated switch for controlling said circuit controlling means.

6. In a brake equipment, the combination with a brake cylinder, of electrically controlled means for releasing fluid under pressure from the brake cylinder, a switch device for controlling the circuit of said electrically controlled brake cylinder fluid releasing means, a door engine for controlling the opening and closing of a car door, electrically controlled means for controlling said door engine, and means for controlling the circuits of both electrically controlled means whereby the operation of said electrically controlled brake cylinder fluid releasing means is prevented when said door engine means is operative.

7. In a brake equipment, the combination with a brake cylinder, of electrically controlled means for releasing fluid from the brake cylinder, means for controlling the circuit of said electrically controlled brake cylinder fluid releasing means, a door engine for controlling the opening and closing of a car door, electrically controlled means for controlling said door engine, a switch for controlling the circuit of said door engine electrically controlled means, and means for controlling the circuits of both electrically controlled means for preventing the operation of said brake cylinder fluid releasing means when said door engine means is operated.

In testimony whereof I have hereunto set my hand, this 20th day of May, 1930.

FRANK B. THOMAS.